United States Patent
Jung et al.

(10) Patent No.: US 8,839,333 B2
(45) Date of Patent: Sep. 16, 2014

(54) METHOD AND APPARATUS FOR TRANSMITTING AND RECEIVING UHD BROADCASTING SERVICE IN DIGITAL BROADCASTING SYSTEM

(75) Inventors: Joon Young Jung, Daejeon-si (KR); Dong Joon Choi, Daejeon-si (KR); Nam Ho Hur, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 13/562,471

(22) Filed: Jul. 31, 2012

(65) Prior Publication Data
US 2013/0174209 A1    Jul. 4, 2013

(30) Foreign Application Priority Data
Jan. 2, 2012  (KR) .................. 10-2012-0000259

(51) Int. Cl.
*H04N 7/173* (2011.01)
*H04N 7/20* (2006.01)
*H04N 7/16* (2011.01)

(52) U.S. Cl.
USPC .............. 725/118; 725/68; 725/139; 725/151

(58) Field of Classification Search
USPC ........................................... 725/68, 139, 151
See application file for complete search history.

(56) References Cited

U.S. PATENT DOCUMENTS 5,920,572 A *  7/1999  Washington et al. .......... 370/535
2010/0199301 A1 *  8/2010  Hayashi et al. ................. 725/32

FOREIGN PATENT DOCUMENTS

KR    1020100029537 A    3/2010

* cited by examiner

*Primary Examiner* — Gigi L Dubasky
(74) *Attorney, Agent, or Firm* — William Park & Associates Patent Ltd.

(57) ABSTRACT

A method and apparatus for transmitting and receiving Ultra High Definition (UHD) broadcasting service in a digital broadcasting system are provided. The method includes receiving a TS through a transport channel, determining whether or not the TS includes information about an association relation with other TSs, analyzing the information about the association relation from the TS, determining whether or not the TS includes information about a program provided in association with the other TSs based on the information about the association relation, extracting the information about the program from the TS, and obtaining the program based on the information about the program. In accordance with the present invention, high definition broadcasting service can be provided because a broadcasting program having a great transmission bandwidth can be transmitted and received in a digital broadcasting system.

10 Claims, 9 Drawing Sheets

METHOD AND APPARATUS FOR TRANSMITTING AND RECEIVING UHD BROADCASTING SERVICE IN DIGITAL BROADCASTING SYSTEM

CROSS-REFERENCE TO RELATED APPLICATIONS

This application claims the benefit of priority of Korean Patent Application No. 10-2012-0000259 filed on Jan. 2, 2012, all of which is incorporated by reference in its entirety herein.

BACKGROUND OF THE INVENTION

1. Field of the Invention

The present invention relates to a digital broadcasting system and, more particularly, to a method and apparatus for transmitting and receiving Ultra High Definition (UHD) broadcasting service in a digital broadcasting system.

2. Related Art

In digital broadcasting, one broadcasting program is transmitted within one MPEG-2 Transport Stream (TS). One or more broadcasting programs are included in one MPEG-2 TS. To transmit one program in one transport stream is called a Single Program Transport Stream (SPTS), and to transport several programs within one transport stream is called a Multi-Program Transport Stream (MPTS).

In general, one program is transmitted in one transport stream. The data transfer rate of the TS is determined by a physical channel capacity. The TS refers to a data stream transmitted within one physical channel. The physical channel capacity refers to the channel capacity of a Radio Frequency (RF) signal on which a broadcasting signal is transmitted in a transport system. For example, in broadcasting transport systems of Korea and North America, a physical broadcasting channel has a frequency band of 6 MHz. In case of terrestrial broadcasting, the physical broadcasting channel has a frequency band of 19.4 Mbps, and in case of cable broadcasting, the physical broadcasting channel has a frequency band of a maximum of 38.8 Mbps.

In High Definition Television (HDTV) service provided in digital broadcasting so far, the amount of data corresponding to one program does not exceed one physical channel capacity provided by a relevant transport system. In contrast, in Ultra High Definition Television (UHDTV) service corresponding to 4 or 16 times the existing HD broadcasting resolution, the amount of data corresponding to one program significantly increases and exceeds one physical channel capacity.

Accordingly, it is no longer possible to transport a UHD broadcasting program through a single TS. In other words, several TSs must be used in order to transport one UHD broadcasting program. In this case, in order for a receiver to normally receive the several TSs and play the UHD broadcasting program, information about the several TSs through which the UHD broadcasting program is transmitted must be provided.

SUMMARY OF THE INVENTION

The present invention provides a method and apparatus for transmitting and receiving UHD or high-capacity broadcasting service by using a plurality of associated Transport Streams (TSs) in a digital broadcasting system.

The present invention also provides a method and apparatus for defining association information between a plurality of TSs and providing UHD or high-capacity broadcasting service by using the association information in a digital broadcasting system.

In an embodiment of the present invention, a method of receiving a plurality of associated Transport Streams (TSs) in an Ultra High Definition (UHD) or high-capacity broadcasting system is provided. The method includes receiving a TS through a transport channel, determining whether or not the TS includes information about an association relation with other TSs, analyzing the information about the association relation from the TS, determining whether or not the TS includes information about a program provided in association with the other TSs based on the information about the association relation, extracting the information about the program from the TS, and obtaining the program based on the information about the program.

Determining whether or not the TS includes the information about the association relation with the other TSs may include extracting a Program Associate Table (PAT) from to the TS and checking whether the information about the association relation exists based on the PAT.

The information about the association relation may include at least one of IDentifier (ID) information about a TS including the information about the program, channel information about the program, and identifier information about each of the other TSs associated with the TS.

The information about the association relation may be included in a Network Information Table (NIT) which is a table for defining information about a network and channel configuration.

Determining whether or not the TS includes the information about the program may include determining whether an ID of the TS is identical with an ID of a TS including the information about the program.

Extracting the information about the program from the TS may include extracting at least one of information about Elementary Streams (ESs) constructing the program and channel information about the program from a Program Map Table (PMT) included in the TS.

In another embodiment of the present invention, an apparatus for receiving a plurality of associated Transport Streams (TSs) in an Ultra High Definition (UHD) or high-capacity broadcasting system is provided. The apparatus includes a reception unit for receiving a TS through a transport channel, an association information processing unit for determining whether or not the TS includes information about an association relation with other TSs and analyzing the information about the association relation from the TS, and a program extraction unit for determining whether or not the TS includes information about a program provided in association with the other TSs based on the information about the association relation and extracting the information about the program from the TS.

The association information processing unit may determine whether the information about the association relation exists or not based on a Program Associate Table (PAT) included in the TS.

The association information processing unit may extract the information about the association relation from a Network Information Table (NIT) which is a table for defining information about a network and channel configuration and analyzes the extracted information.

The program extraction unit may extract the information about the program from a Program Map Table (PMT) included in the TS.

In still another embodiment of the present invention, a method of transmitting a plurality of associated Transport Streams (TSs) in an Ultra High Definition (UHD) or high-capacity broadcasting system is provided. The method includes splitting an image of a broadcasting program into a plurality of TSs based on a capacity of a transport channel, generating information about an association relation between the plurality of TSs, and transmitting the plurality of TSs through the respective transport channels, wherein at least one of the plurality of TSs includes the information about the association relation, and any one of the plurality of TSs includes information about the broadcasting program.

The information about the association relation may include at least one of identifier information about each of the plurality of TSs, ID information about a TS including the information about the broadcasting program, and channel information about the broadcasting program.

Generating the information about the association relation between the plurality of TSs may include defining the information about the association relation in a Network Information Table (NIT) which is a table for defining information about a network and channel configuration.

The information about the broadcasting program may include at least one of information about Elementary Streams (ESs) constructing the broadcasting program and channel information about the broadcasting program.

The information about the broadcasting program may be defined by using a Program Map Table (PMT).

In still another embodiment of the present invention, an apparatus for transmitting a plurality of associated Transport Streams (TSs) in an Ultra High Definition (UHD) or high-capacity broadcasting system is provided. The apparatus includes a TS generation unit for splitting an image of a broadcasting program into a plurality of TSs based on a capacity of a transport channel, an association information generation unit for generating information about an association relation between the plurality of TSs, and a transmission unit for transmitting the plurality of TSs through the respective transport channels, wherein at least one of the plurality of TSs includes the information about the association relation, and any one of the plurality of TSs includes information about the broadcasting program.

The association information generation unit may generate the information about the association relation by using a Network Information Table (NIT) which is a table for defining information about a network and channel configuration.

The information about the broadcasting program may use a Program Map Table (PMT).

DESCRIPTION OF EXEMPLARY EMBODIMENTS

Hereinafter, some embodiments of the present invention are described in detail with reference to the accompanying drawings in order for those skilled in the art to be able to readily implement the invention. Furthermore, the present invention is not limited to the following embodiments and may be modified in various ways within the scope of the technical spirit of the present invention.

Elements described in this specification may include additional elements other than elements to be described later, at need, and a detailed description of parts not directly related to the present invention or redundant parts is omitted. Furthermore, when it is said that any part includes (or comprises) any element, it means the part does not exclude other elements and may further include other elements.

A digital broadcasting system according to an embodiment of the present invention multiplexes pieces of multimedia information, such as audio, video, and data, on the basis of the ISO/IEC 13818-1: MPEG-2 system standard, that is, an international standard in the form of a Transport Stream (TS) and transmits the multimedia information. Furthermore, the digital broadcasting system according to the embodiment of the present invention is illustrated as providing a UHD or high-capacity broadcasting program by using a compression scheme, such as MPEG-2 or Advanced Video Coding (AVC), but the digital broadcasting system may encode the UHD or high-capacity broadcasting program by using other compression schemes.

Figure 1:
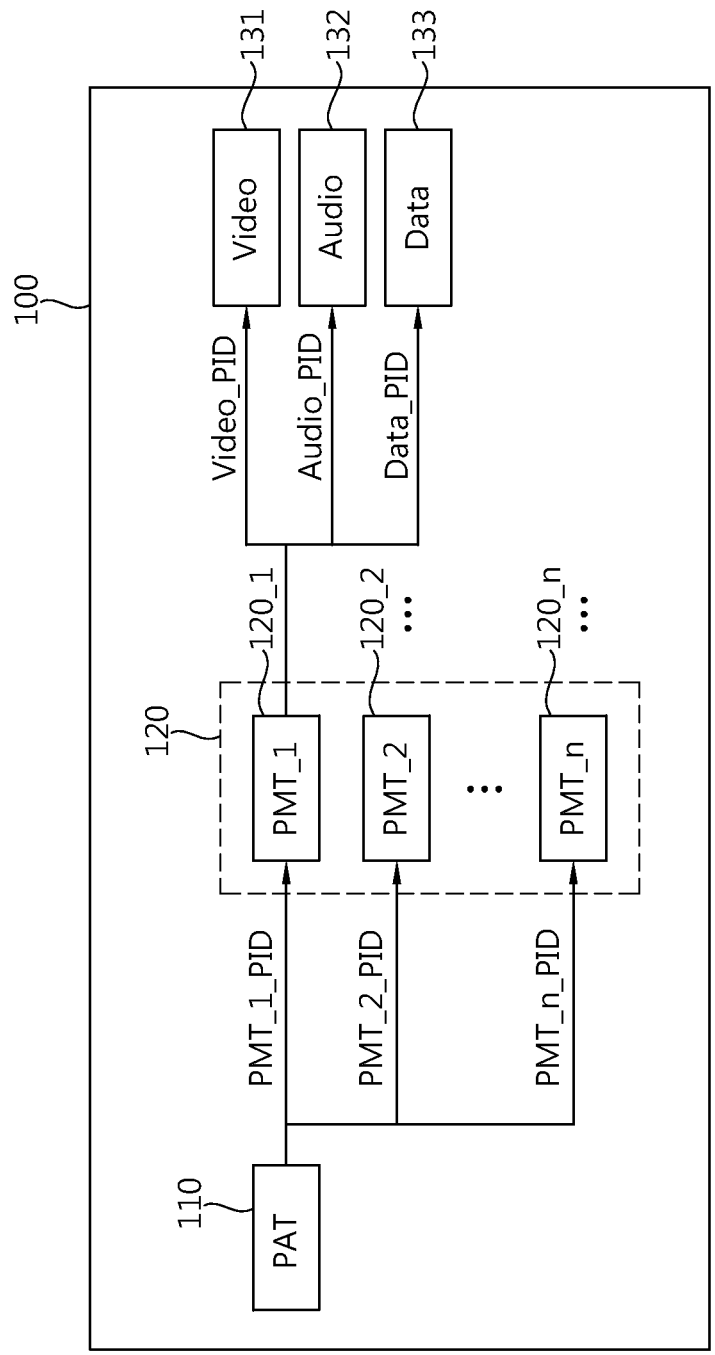
FIG. 1 is a diagram illustrating a method of transmitting and receiving a broadcasting program by using one Transport Stream (TS) in the existing digital broadcasting system.

FIG. 1 is a diagram illustrating a method of transmitting and receiving a broadcasting program by using one transport stream in the existing digital broadcasting system.

An MPEG-2 Transport Stream (hereinafter referred to as TS) consists of several MPEG-2 TS packets. Each MPEG-2 TS packet consists of a 4-byte header and an 184-byte payload. Furthermore, the header includes a Packet IDentifier (PID) for indicating the type of the MPEG-2 TS packet and a field for defining a flag. The payload includes pieces of information, such as video, audio, and data.

Referring to FIG. 1, a TS 100 8 includes a Program Associate Table (PAT) 110 for information about a broadcasting program transmitted within the TS 100, a Program Map Table (PMT) 120, and TS packets including video 131, audio 132, and data 133 for the broadcasting program.

The PAT 110 is a kind of data structure defined in the MPEG-2 standard. The PAT 110 includes a Transport Stream ID (TSID), that is, information about the ID of a TS and PMT information that includes information about all broadcasting programs transmitted within the TS, that is, PIDs of PMTs.

The PMT 120 includes information about broadcasting programs. That is, the PMT 120 includes PMTs for respective broadcasting programs which are transmitted within the TS. Each of the PMTs includes pieces of information, such as PIDs of Elementary Streams (ESs), such as the video, audio, and data of each broadcasting program, and a service type.

For example, if n PMTs 120_1 to 120_n exist within the TS 100 as shown in FIG. 1, it means that n broadcasting programs are transmitted through the one TS 100. Furthermore, it means that a broadcasting program including the video 131, the audio 132, and data 133, from among the n broadcasting programs, is transmitted in the PMT 120_1.

Meanwhile, when a reception apparatus receives the TS 100 through a transport channel, the reception apparatus first extracts a TS packet including the PAT 110 from the TS 100. As described above, the header of the TS packet includes a PID of the TS packet for identifying the type of the TS packet included in a payload. In the MPEG-2 system standard, 0 is allocated to the PID of the TS packet including the PAT. That is, the PAT 110 can be obtained by extracting a TS packet in which the PID value of a packet is 0 from the received TS 100.

Next, information about the number of broadcasting programs included in the TS 100 and information about each of the broadcasting programs included in the TS 100 may be obtained by extracting information about a PID of the TS packet, including the PMT 120, from the obtained PAT 110.

For example, when a program selected by a user is the PMT_1 120_1, the PIDs of the TS packet including the video 131, the audio 132, and data 133 of the broadcasting program, may be obtained from the TS 100 by analyzing the PMT_1 120_1. That is, Video_PID, Audio_PID, and Data_PID may be obtained. After the TS packets 131, 132, and 133 corresponding to the PIDs are extracted and reconstructed, the broadcasting program PMT_1 120_1 may be watched.

A process of generating a TS by compressing pieces of content, such as video, audio, and data, in order to provide UHD broadcasting having a transmission bandwidth in the existing digital broadcasting system is described below with reference to FIGS. 2 and 3.

Figure 2:
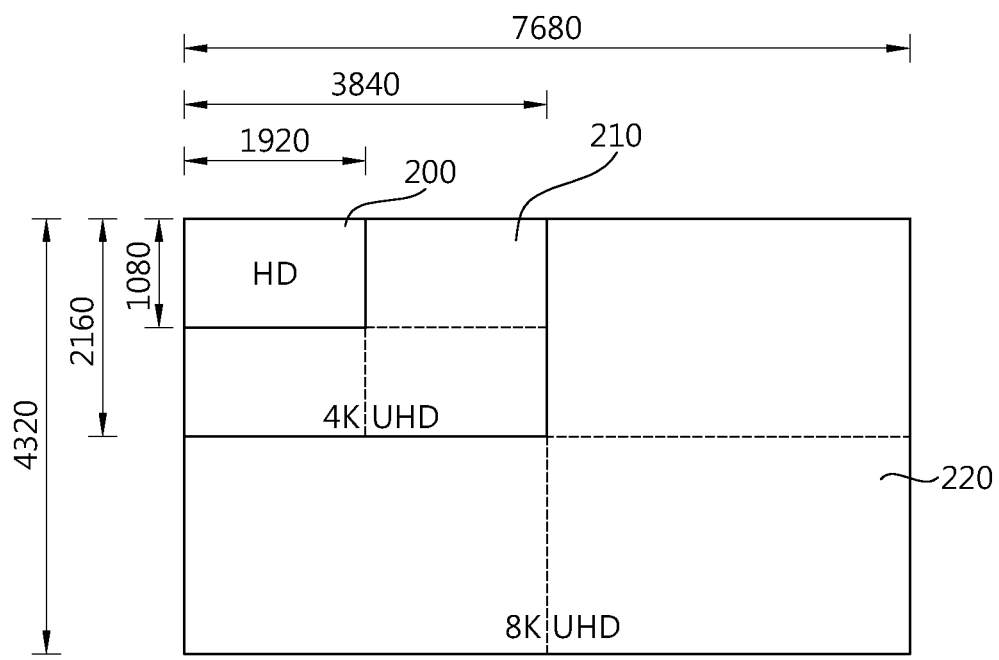
FIG. 2 is a diagram showing a comparison between High Definition (HD) to resolution and Ultra High Definition (UHD) resolution.
Figure 3:
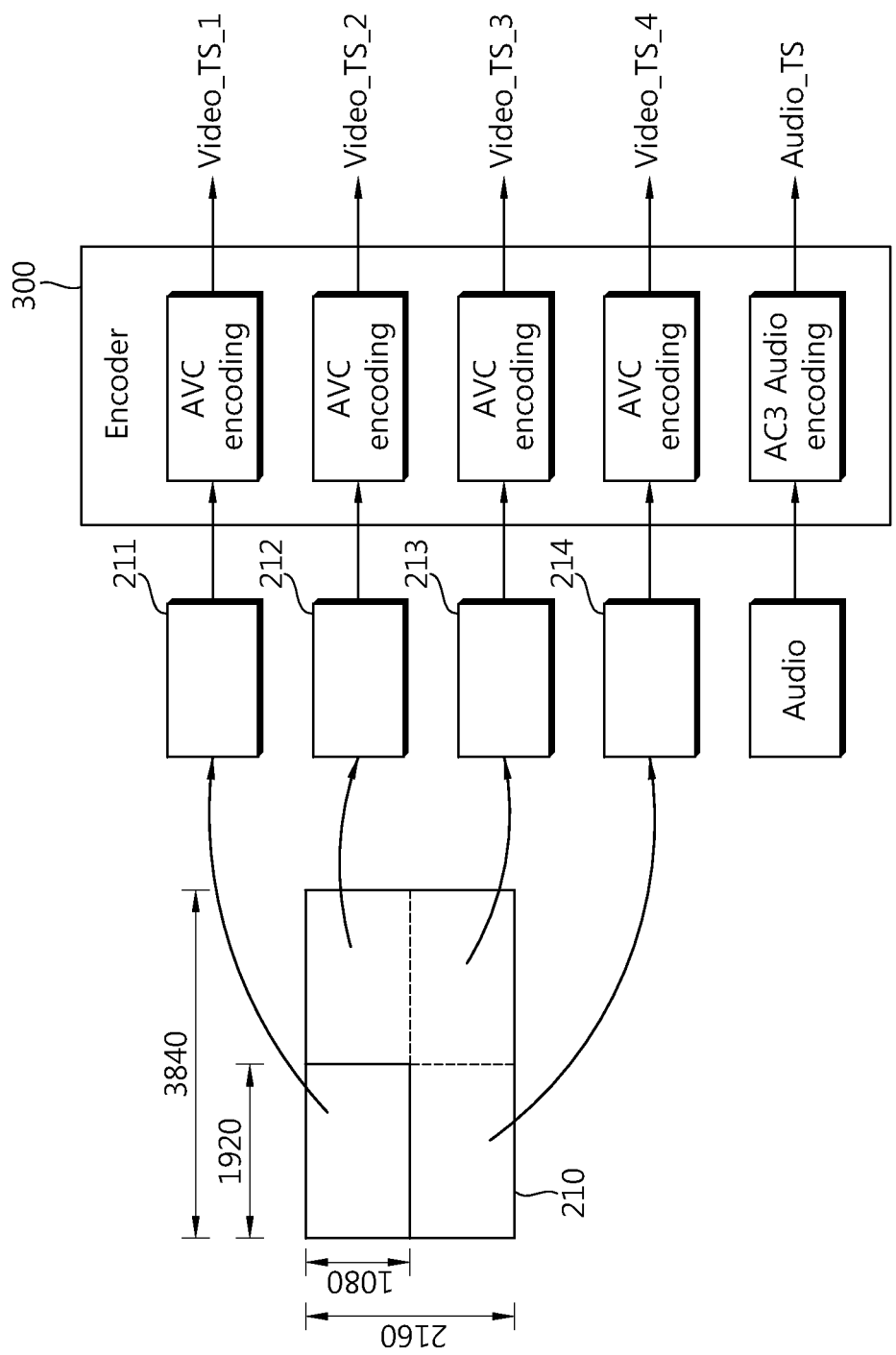
FIG. 3 is a diagram simply showing a process of generating a TS by performing compression on a 4K UHD image.

FIG. 2 is a diagram showing a comparison between High Definition (HD) resolution and Ultra High Definition (UHD) resolution, and FIG. 3 is a diagram simply showing a process of generating a transport stream by performing compression on a 4K UHD image.

Referring to FIG. 2, a 4K UHD image 210 has resolution corresponding to 4 times an HD image 200, and an 8K UHD image 220 has resolution corresponding to 16 times the HD image 200.

Here, the existing digital broadcasting system provides broadcasting service by limiting an image inputted to an encoder, to an HD image having a maximum of 1920×1080 resolutions using a compression method, such as MPEG-2 and Advanced Video Coding (AVC).

Accordingly, the image 210 having the 4K UHD resolution is split into 4, and each of the 4 split parts is compressed. Furthermore, the image 220 having the 8K UHD resolution is split into 16, and each of the 16 split parts is compressed. When the 4K UHD image 210 and the 8K UHD image 220 are sought to be reconstructed, each of the split and compressed parts is decompressed, and the decompressed parts are combined to construct one image.

More particularly, referring to FIG. 3, the 4K UHD image 210 is split into 4 parts 211 to 214. The 4 split parts 211 to 214 are individually compressed by an encoder 300 using, for example, an AVC method, thus constructing 4 video TSs. Furthermore, audio included in the 4K UHD image 210 is compressed by the encoder 300 using, for example, an AC3 method, thus constructing one audio TS.

For example, if the 4K UHD image 210 has been compressed in a transfer rate of 9 Mbps by the encoder 300 (in general, AVC compression for HD video has a transfer rate of about 8 to 10 Mbps), one 4K UHD image 210 may be transmitted by using a minimum of two RF channels in a terrestrial broadcasting system having a capacity of 19.39 Mbps per channel. That is, it means that a 4K UHD broadcasting program can be transmitted by two TSs.

As described above, the existing digital broadcasting system provides one broadcasting program or a plurality of broadcasting program by using one transport stream. In order to provide a UHD, high-capacity, and high-quality broadcasting program having a great transmission bandwidth, a plurality of TSs must be used owing to the physical channel capacity of the existing digital broadcasting system (refer to FIGS. 2 and 3). Accordingly, the present invention provides a method of transmitting and receiving a UHD or high-capacity broadcasting program by using a plurality of TSs.

Figure 4:
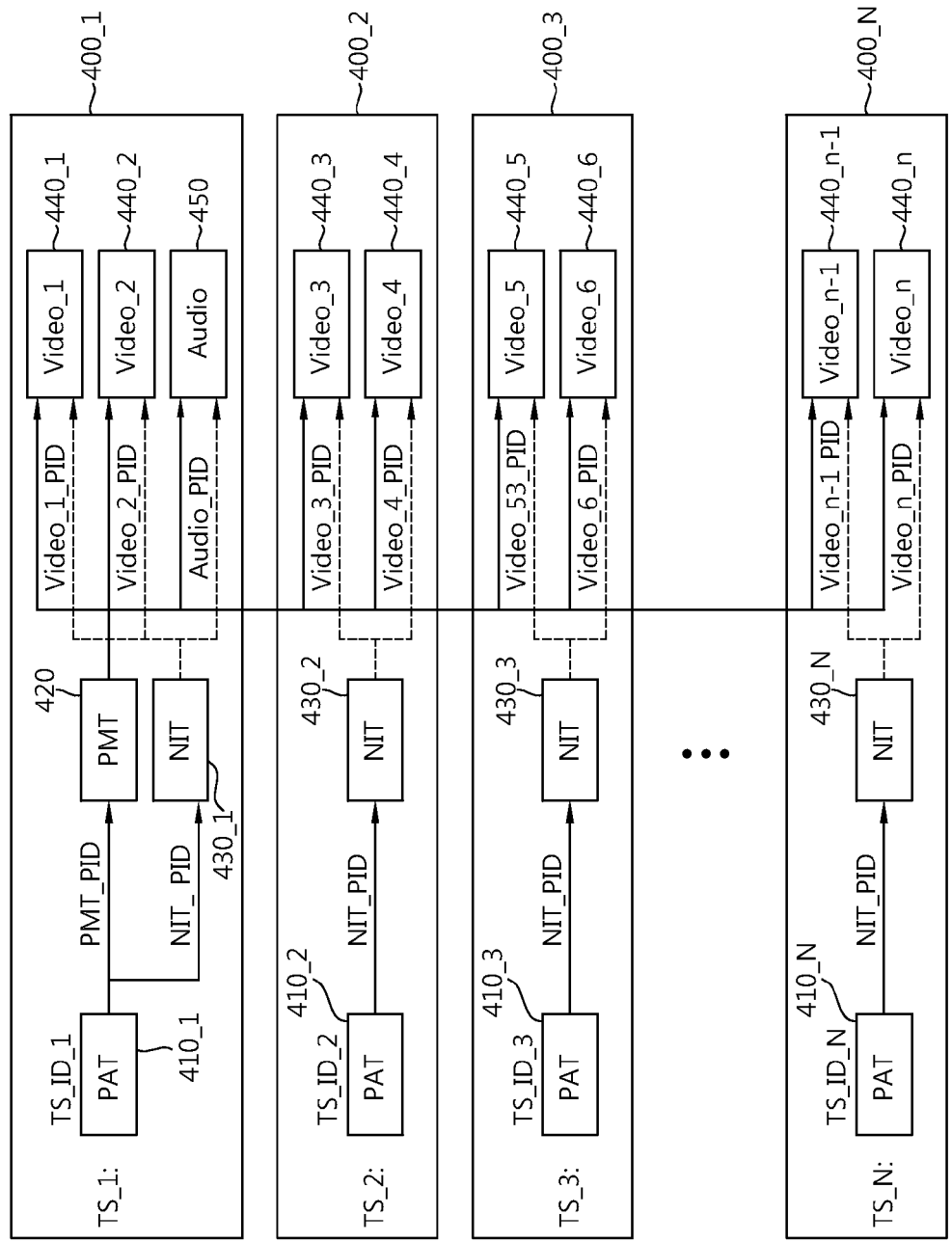
FIG. 4 is a diagram schematically showing a method of providing a broadcasting program by using a plurality of TSs in a digital broadcasting system according to an embodiment of the present invention.

FIG. 4 is a diagram schematically showing a method of providing a broadcasting program by using a plurality of TSs in a digital broadcasting system according to an embodiment of the present invention.

As shown in FIG. 4, in case of a broadcasting program for providing service, such as UHD, high capacity, and high definition image having a great transmission bandwidth, one image may consist of n video TSs 440_1 to 440_n and one audio TS 450, which are transmitted by using n TSs 400_1 to 400_N.

In this case, a method of receiving the n TSs 400_1 to 400_N and reconstructing them to one broadcasting program again is required. That is, there is a need for information about an association relation indicating that the n TSs 400_1 to 400_N transport one broadcasting program.

To this end, a Network Information Table (NIT), including information about a network and a channel configuration that is transmitted by a transport stream, may be used as a table that may be defined and used by a user in the MPEG-2 system standard. Accordingly, information about an association relation between the n TSs 400_1 to 400_N is defined within the NIT, and the NIT is transmitted along with the TS 400_1 to 400_N.

As shown in FIG. 4, the n TSs 400_1 to 400_N include respective NITs 430_1 to 430_N in each of which information about an association relation is defined. Here, each of the NITs 430_1 to 430_N includes identifier (TSID) information about each of the n associated TSs 400_1 to 400_N through which one broadcasting program is transmitted, service type information indicating that the n associated TSs 400_1 to 400_N will provide what service, and information about an Elementary Stream (ES) transmitted in each of the n associated TSs 400_1 to 400_N.

Furthermore, the n TSs 400_1 to 400_N include a PMT 420 in which information about the broadcasting program transmitted through the n TSs 400_1 to 400_N is defined. Here, the PMT 420 is included in any one TS 400_1 of the n TSs 400_1 to 400_N and transmitted. That is, the one PMT 420 is used because the one broadcasting program is transmitted through the n TSs 400_1 to 400_N. Furthermore, the PMT 420 includes not only ESs 440_1, 440_2, 450 included in the TS 400_1 through which the PMT 420 is transmitted, but also information about ESs 440_3 to 440_n included in the remaining TSs 400_2 to 400_N. That is, the PMT 420 includes information about all the ESs which construct the one broadcasting program transmitted through the n associated TSs 400_1 to 400_N.

Here, when the one broadcasting program is transmitted through the n TSs 400_1 to 400_N, the TS 400_1 including the PMT 420 is called a main TS and the channel number program_number of the broadcasting program indicated by the PMT 420 is called a main program_number. This information is included in the NIT and transmitted.

However, a TS may transport two or more broadcasting programs, and two or more broadcasting programs may be transmitted through a plurality of associated TSs.

Furthermore, the n TSs 400_1 to 400_N include respective Program Associate Tables (PATs) 410_1 to 410_N. The PATs 410_1 to 410_N include respective pieces of TS 400_1 to 400_N identifier (TSID) information, respective pieces of NITs 430_1 to 430_N identifier (PID) information, and respective pieces of PMT 420 identifier (PID) information.

Meanwhile, in another embodiment of the present invention, the NIT may have only to be included in at least one of the n TSs 400_1 to 400_N. In this case, the NIT block may be omitted in TSs other than the at least one of the TSs 400_1 to 400_N shown in FIG. 4.

The construction and grammar of the NIT according to an embodiment of the present invention is described below with reference to Table 1.

TABLE 1

| Sentence Structure | Number of bits | Remarks |
|---|---|---|
| Network_information_section ( ) | | |
| Table_id | 8 | 0x50 |
| Section_syntax_indicator | 1 | 1 |
| Private_indicator | 1 | 1 |
| Reserved | 2 | 11 |
| Private_section_length | 12 | |
| Table_id_extention | 16 | |
|    Reserved | 2 | |
|    Version_number | 5 | |
|    Current_next_indicator | 1 | |
| Section_number | 8 | |
| Last_section_number | 8 | |
| Reserved | 7 | |
| Transport_stream_linkage_indicator | 1 | |
| If(transport_stream_linkage_indicator == 1){ | | |
| Num_of_linkage_programs | 8 | |
| For(i=0; i<N; i++){ | | |
|    Service_type | 5 | |
|    Reserved | 3 | |
|       Main_transport_stream_ID | 16 | |
|       Main_program_number | 16 | |
| Num_of_linkage_transport_streams | 8 | |
| For(i=0; i<N; i++){ | | |
|    Linkage_transport_stream_ID | 16 | |
| } | | |
| Num_of_elementary_streams_in_current_TS | 8 | |
| For(i=0; i<N; i++){ | | |
|    Stream_type | 8 | |
|    reserved | 3 | |
|    Elementary_stream_PID | 13 | |
| } | | |
|    } | | |
| } | | |
| else { | | |
| Service_type | 5 | |
| Reserved | 3 | |
| } | | |
|    CRC_32 | 32 | |
| } | | |

Referring to Table 1, Table_id is for identifying the table type of a relevant section and may be set as an ID value of the table for defining information about an association relation between TSs according to the present invention. For example, the information about the association relation between the TSs may be defined by using an NIT and may be set to a 0x50 value in order to indicate the NIT.

Section_syntax_indicator indicates whether a specific grammar defined in the MPEG-2 system standard will be followed or not. In this case, the Section_syntax_indicator field is always set to a value of 1. Private_indicator indicates whether a user will use it as special purposes or not. In this case, the Private_indicator field is always set to a value of 1.

Private_section_length indicates the total length (i.e., the number of bytes) of a relevant section. Table_id_extention is a field that may be defined and used by a user, and use thereof is not additionally defined. Version_number indicates a version of a relevant section, and the value of the Version_number is increased by 1 when the contents of a relevant section are changed. Current_next_indicator has a value of 1 when a relevant section is now valid and has a value of 0 when a section transmitted next is valid.

Section number indicates the number of a relevant section when one table consists of several sections. Last_section_number indicates the number of the last section when one table consists of several sections. Transport_stream_linkage_indicator is a field that indicates whether a relevant TS provides a program while operating in conjunction with other TSs or not. If a relevant TS has an association relation with other TSs, the Transport_stream_linkage_indicator is set to a value of 1. Num_of_linkage_programs indicates the number of programs which are provided while being operated in conjunction with other TSs within a relevant TS. Service_type indicates the service type of a relevant program and follows values listed in Table 2 below.

TABLE 2

| Value | Meaning |
|---|---|
| 0x01 | Reserved |
| 0x01 | HDTV service |
| 0x02 | Stereoscopic 3DTV service |
| 0x03 | Multi-view 3DTV service |
| 0x04 | UHDTV service |
| 0x05~0x1F | Use according to user definition |

Referring to Table 1, a Main_transport_stream_ID indicates an ID value of a TS including a PMT that indicates configuration information about a program. For example, if one broadcasting program is transmitted through a plurality of TSs, an ID value of a TS transmitted along with a PMT including information about a broadcasting program, from among the plurality of TSs, is stored in the Main_transport_stream_ID field. Main_program_number indicates a program number indicated by a PMT. The program number is a number allocated to each program. In this case, Main_program_number refers to a channel number for a broadcasting program which is transmitted through a plurality of associated TSs. Num_of_linkage_transport_streams indicates the number of TSs through which a program is transmitted. Here, the number of TSs indicates the number of associated TSs other than a relevant TS. Linkage_transport_stream_ID indicates ID values of TSs which are associated with a relevant TS and used to transport one program. Num_of_elementary_streams_in_current_TS indicates the number of ESs of a program transmitted by a relevant TS. Stream_type is a value that indicates the ES type of a program transmitted by a relevant TS. A value defined in the MPEG-2 system standard is used as the Stream_type value. For example, if the type of an ES is MPEG-2 video, the value is 0x02. If the type of an ES is AVC video, the value is 0x1B. Elementary_stream_PID indicates a PID of a TS packet including the ESs of a program transmitted by a relevant TS. CRC_32 is a value indicating whether there is an error in a relevant section or not. The CRC_32 value indicates a Circular redundancy check value defined in the MPEG-2 system standard. An NIT according to an embodiment of the present invention may include pieces of necessary information other than the above-described fields.

A process of transmitting and receiving a UHD, high capacity, or high-quality broadcasting program by using a plurality of associated TSs and NITs in a digital broadcasting system is described below.

Figure 5:
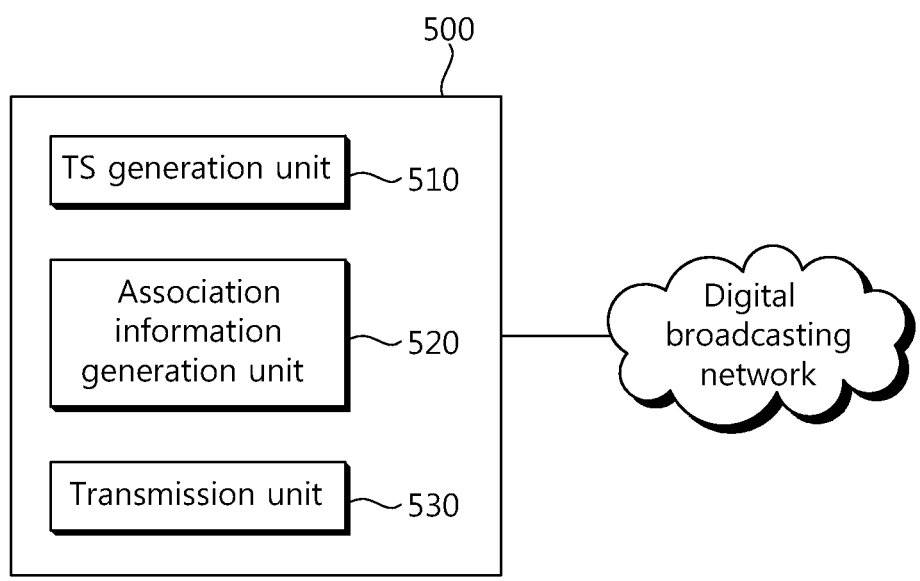
FIG. 5 is a diagram schematically showing the structure of a transmission apparatus of the digital broadcasting system according to an embodiment of the present invention.

FIG. 5 is a diagram schematically showing the structure of a transmission apparatus of the digital broadcasting system according to an embodiment of the present invention.

Referring to FIG. 5, the transmission apparatus 500 includes a TS generation unit 510, an association information generation unit 520, and a transmission unit 530.

The TS generation unit 510 splits an image of a broadcasting program to be transmitted into a plurality of TSs on the basis of the capacity of a transport channel. For example, a broadcasting program that provides a UHD, high-capacity, or high-quality image having a great transmission bandwidth is split into a plurality of TSs and the broadcasting program is then transmitted by taking a capacity that may be transmitted by one physical channel into consideration because the image may exceed the amount of data that may be transmitted through one physical channel.

The association information generation unit 520 generates information about an association relation between a plurality of TSs. That is, if one broadcasting program is split into a plurality of TSs in order to send the broadcasting program, information about an association relation between the TSs is generated. If a plurality of associated TSs is subsequently received, the TSs may be reconstructed to one broadcasting program by using information about an association relation between the TSs.

Here, the information about the association relation may include identifier (TSID) information about each of a plurality of associated TSs that transmit one broadcasting program, identifier (TSID) information about a TS including PMT that indicates information about a broadcasting program from among a plurality of associated TSs, and a channel number for a broadcasting program transmitted by a plurality of associated TSs. Furthermore, the information about the association relation may be generated using an NIT, and the generated NIT is included in each of the plurality of associated TSs.

For example, identifier information about each of a plurality of associated TSs may be defined in the Linkage_transport_stream_ID field of an NIT, identifier information about a TS including information about a broadcasting program transmitted by a plurality of associated TSs may be defined in the Main_transport_stream_ID field, and a channel number for a broadcasting program may be defined in the Main_program_number field.

The transmission unit 530 sends a plurality of TSs through respective transport channels. That is, a plurality of TSs, including pieces of information about an association relation and information about a broadcasting program generated by the TS generation unit 510 and the association information generation unit 520, is transmitted through respective transport channels.

The transmission apparatus 500 may further include a program information generation unit (not shown) for defining information about a broadcasting program within a PMT and including the information in any one of a plurality of associated TSs.

Figure 6:
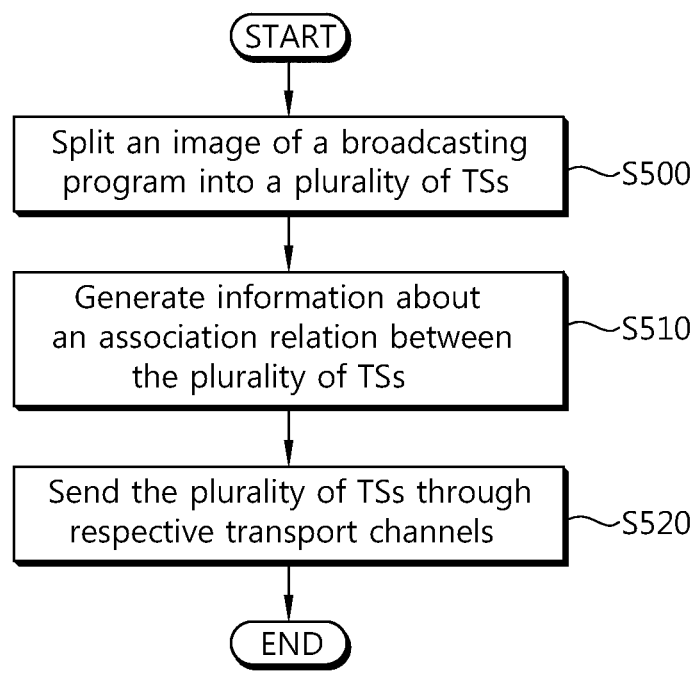
FIG. 6 is a flowchart illustrating an operation of the transmission apparatus according to an embodiment of the present invention.

FIG. 6 is a flowchart illustrating an operation of the transmission apparatus 500 according to an embodiment of the present invention.

Referring to FIG. 6, the transmission apparatus 500 splits an image of a broadcasting program to be transmitted into a plurality of TSs on the basis of the capacity of a transport channel at step S500. For example, a broadcasting program that serves a UHD, high-capacity, or high quality image having a great transmission bandwidth is split into TSs that may be transmitted through one physical channel because the broadcasting program exceeds a data capacity that may be transmitted using the one physical channel.

Next, the transmission apparatus 500 generates information about an association relation between the plurality of TSs at step S510. Here, the information about the association relation refers to information on which a plurality of TSs is operated together to construct one broadcasting program when the plurality of TSs is received again after the TSs are transmitted.

Here, the information about the association relation may include identifier information about each of the plurality of associated TSs that send one broadcasting program, identifier information about a TS that sends a PMT defining information about the broadcasting program, and channel information about the broadcasting program. The information may be defined by using the above-described NIT. Furthermore, each of the plurality of associated TS includes the information about the association relation, and any one of the plurality of associated TSs includes a PMT that defines the information about the broadcasting program.

Next, the transmission apparatus 500 sends the plurality of TSs through respective transport channels at step S520. That is, information about an association relation and information about a broadcasting program are included in each of a plurality of TSs, and the TSs are transmitted through respective transport channels.

Figure 7:
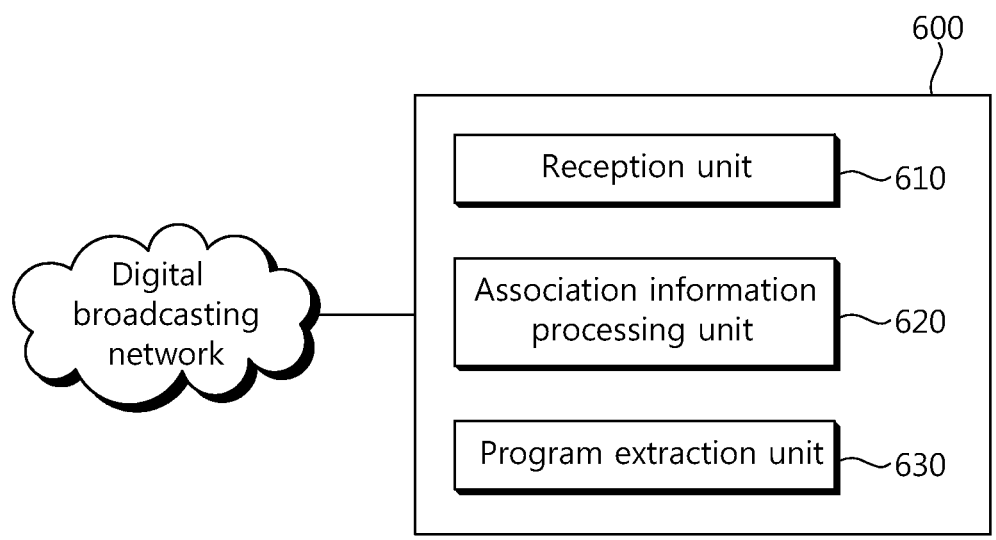
FIG. 7 is a diagram schematically showing the structure of a reception apparatus of the digital broadcasting system according to an embodiment of the present invention.

FIG. 7 is a diagram schematically showing the structure of a reception apparatus of the digital broadcasting system according to an embodiment of the present invention.

Referring to FIG. 7, the reception apparatus 600 includes a reception unit 610, an association information processing unit 620, and a program extraction unit 630.

The reception unit 610 receives a TS through a transport channel. For example, the reception unit 610 may receive TSs, including UHD, high-capacity, or high-quality image content, from the transmission apparatus of a digital broadcasting system over a digital broadcasting network.

The association information processing unit 620 determines whether a received TS includes information about an association relation with other TSs or not and analyzes the information about the association relation from the received TS. That is, the association information processing unit 620 determines whether a broadcasting program transmitted by the received TS in association with other TSs exists or not, extracts information about an association relation between the TSs that send the broadcasting program, and analyzes the extracted information.

More particularly, the association information processing unit 620 extracts a PAT from the received TS and checks whether there is a PID of an NIT packet indicated by the PAT or not. If, as a result of the check, there is an NIT, it means that the received TS includes a broadcasting program transmitted while operating in conjunction with other TSs. Thus, the association information processing unit 620 extracts a TS packet, including the NIT, from the received TS and analyzes the NIT.

Here, the association information processing unit 620 may obtain information about an association relation, including identifier information about a TS including information about the broadcasting program, channel information about the broadcasting program, and identifier information about each of other TSs that send the broadcasting program in association with the received TS, from the NIT.

The program extraction unit 630 determines whether or not the received TS includes information about the broadcasting program provided in association with other TSs on the basis of the information about the association relation and extracts information about the broadcasting program from the received TS.

More particularly, the program extraction unit 630 determines whether or not an ID of the received TS is the same as an ID of a TS including information about the broadcasting program which has been induced from an analysis of the NIT. If, as a result of the determination, the two IDs are identical with each other, it means that the received TS includes a PMT including the information about the broadcasting program. Thus, the program extraction unit 630 may extract the PMT from the received TS and analyze the extracted PMT. For example, the program extraction unit 630 may obtain information about ESs, constructing the broadcasting program, and channel information about the broadcasting program from the PMT.

Figure 8:
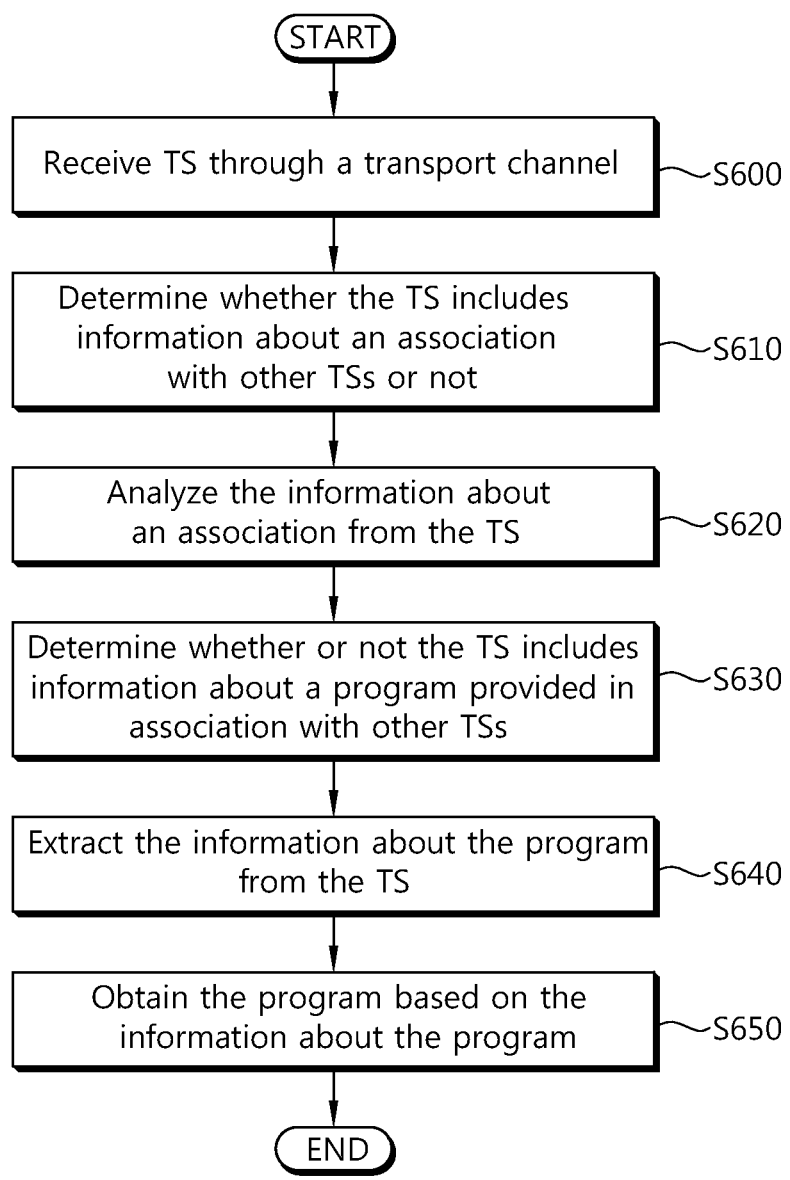
FIG. 8 is a flowchart illustrating an operation of the reception apparatus according to an embodiment of the present invention.

FIG. 8 is a flowchart illustrating an operation of the reception apparatus according to an embodiment of the present invention.

Referring to FIG. 8, the reception apparatus 600 receives a TS through a transport channel at step S600. For example, the reception apparatus 600 may receive a TS, including a broadcasting program that serves UHD or high-capacity image content, from the transmission apparatus 500 of the digital broadcasting system over a digital broadcasting network.

Next, the reception apparatus 600 determines whether the received TS includes information about an association relation with other TSs or not at step S610. That is, the reception apparatus 600 determines whether a broadcasting program transmitted by the received TS in association with other TSs exists or not. The reception apparatus 600 may extract a PAT from the received TS and determine whether a PID value of an NIT packet including information about an association relation exists or not on the basis of the PAT.

Next, the reception apparatus 600 analyzes the information about the association relation from the received TS at step S620. That is, if, as a result of the determination at step S610, the information about the association relation is determined to exist, the reception apparatus 600 extracts an NIT from the received TS and analyzes the NIT.

The reception apparatus 600 may obtain the information about the association relation, including identifier information of a TS including information about the broadcasting program, channel information about the broadcasting program, and identifier information about each of other TSs that send the broadcasting program in association with the received TS, by analyzing the NIT.

Next, the reception apparatus 600 determines whether or not the received TS includes information about the broadcasting program, provided in association with other TSs, on the basis of the information about the association relation at step S630. To this end, the reception apparatus 600 compares an ID of the received TS with an ID of a TS including the information about the broadcasting program, obtained as a result of an analysis of the NIT in order to determine whether the two IDs are identical with each other or not.

Next, the reception apparatus 600 extracts information about the broadcasting program from the received TS at step S640. That is, if, as a result of the determination at step S630, the received TS is determined to include the information about the broadcasting program, that is, a PMT, the reception apparatus 600 extracts the PMT from the received TS and analyzes the extracted PMT. For example, the reception apparatus 600 may obtain information about ESs constructing the broadcasting program, and channel information about the broadcasting program from the PMT.

Next, the reception apparatus 600 obtains the broadcasting program on the basis of the information about the broadcasting program at step S650. For example, the reception apparatus 600 may extract the information about ESs, such as video, audio, and data that construct the broadcasting program, from the PMT and reconstruct the extracted information to one broadcasting program.

Figure 9:
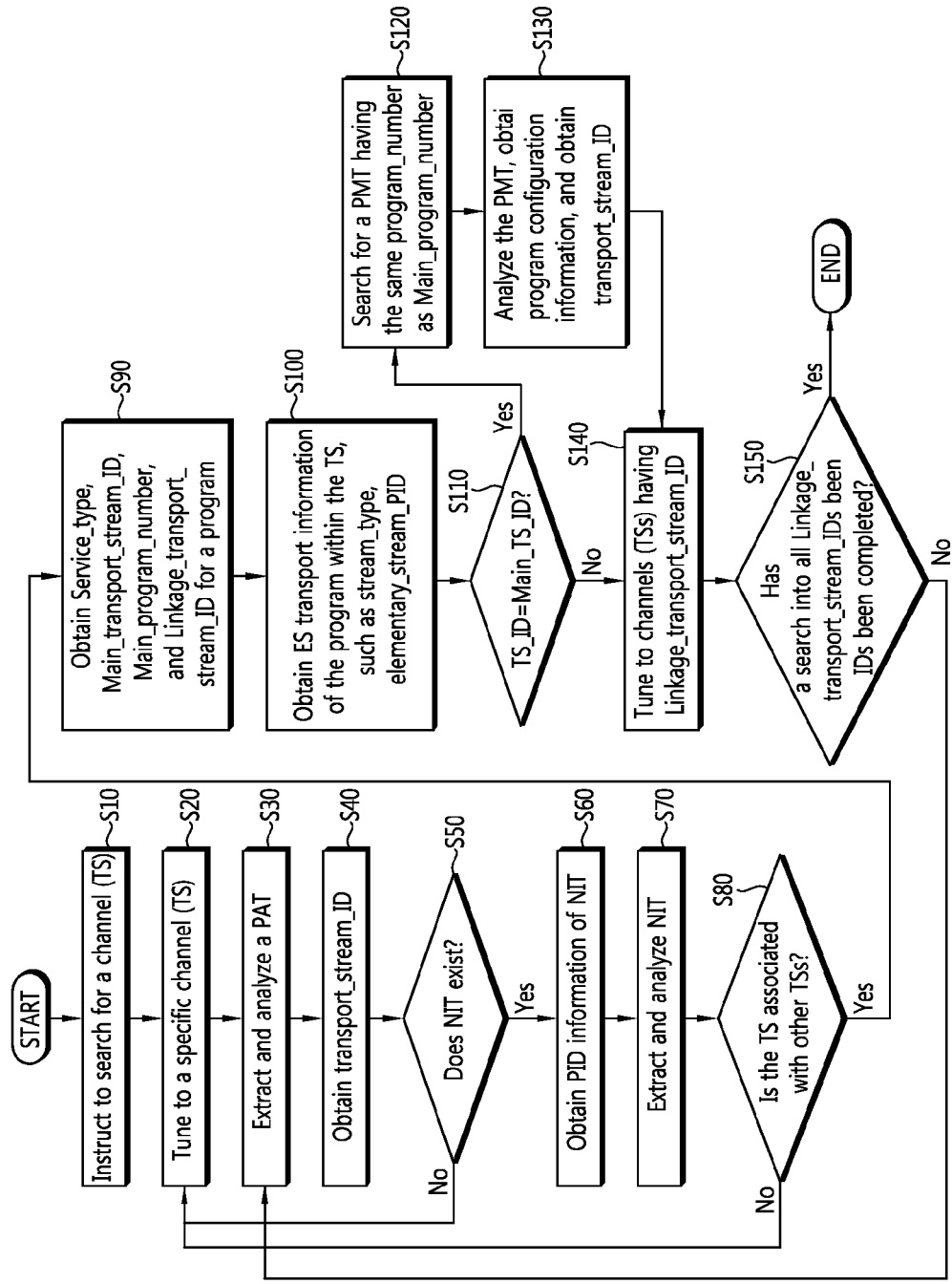
FIG. 9 is a diagram showing a process in which the reception apparatus obtains a broadcasting program by using a Network Information Table (NIT) according to an embodiment of the present invention.

FIG. 9 is a diagram showing a process in which the reception apparatus 500 obtains a broadcasting program by using an NIT according to an embodiment of the present invention.

Referring to FIG. 9, a user instructs a search into a channel that provides UHDTV service in the reception apparatus 600 at step S10.

In response to the instruction of the search into a channel, the reception apparatus 600 is tuned to a specific (in general, the lowest frequency band) channel, and it receives a TS transmitted by the tuned channel at step S20.

The reception apparatus 600 extracts a PAT from the received TS and analyzes the PAT at step S30. That is, the reception apparatus 600 extracts a part in which a PID of a TS packet is 0 from the received TS, obtains the PAT from the extracted part, and analyzes the PAT.

The reception apparatus 600 obtains the transport_stream_ID value of the received TS from the PAT extracted at step S30 and stores the obtained transport_stream_ID value at step S40. The reception apparatus 600 determines whether an NIT exists or not at step S50. That is, the reception apparatus 600 determines whether PID information about a TS packet including the NIT exists or not based on the PAT.

If, as a result of the determination at step S50, the NIT is determined to exist, the reception apparatus 600 obtains the PID information of the NIT from the PAT at step S60. If, as a result of the determination at step S50, the NIT is determined not to exist, the reception apparatus 600 is turned to another specific channel at step S20.

The reception apparatus 600 extracts the TS packet including the NIT from the received TS on the basis of the PID information of the NIT obtained at step S60 and analyzes each of the fields of the extracted NIT at step S70.

The reception apparatus 600 determines whether or not a broadcasting program transmitted by the received TS in association with other TSs exists on the basis of the extracted NIT at step S80. The reception apparatus 600 checks a value of the Transport_stream_linkage_indicator field of the NIT.

If the Transport_stream_linkage_indicator field has a value of 0, it means that a broadcasting program transmitted by the received TS in association with other TSs does not exist. In this case, the process returns to step S20.

In contrast, if the Transport_stream_linkage_indicator field has a value of 1, it means that a broadcasting program transmitted by the received TS in association with other TSs exists. Thus, the reception apparatus 600 obtains information about the broadcasting program and information about an association relation between the TSs from the NIT at step S90. For example, the reception apparatus 600 may obtain values for Service_type, Main_transport_stream_ID, Main_program_number, and Linkage_transport_stream_ID.

Furthermore, the reception apparatus 600 obtains information about ESs, constructing the broadcasting program transmitted within the received TS, from the NIT at step S100. For example, the reception apparatus 600 may obtain stream_type, elementary_stream_PID, and so on.

The reception apparatus 600 determines whether or not the transport_stream_ID value of the received TS obtained at step S40 is identical with the Main_transport_stream_ID value obtained from the NIT at step S90 at step S110. That is, the reception apparatus 600 determines whether the received TS includes information about the broadcasting program, that is, a PMT.

If, as a result of the determination at step S110, the transport_stream_ID value is determined to be identical with the Main_transport_stream_ID value, the reception apparatus 600 extracts a PMT(or PMTs) from the received TS and analyzes the extracted PMT(or PMTs) at step S120. That is, the reception apparatus 600 may extract a TS packet including the PMT from the received TS and analyze the TS packet because the PMT is included in the received TS. Here, in order to extract the PMT including the information about the broadcasting program transmitted by the received TS in association with other TSs, the reception apparatus 600 searches for a PMT having the same program_number as Main_program_number obtained at step S90.

Next, the reception apparatus 600 obtains configuration information about the broadcasting program from the extracted PMT at step S130. Here, the reception apparatus 600 may obtain PID information of ESs, including video, audio, and data constructing the broadcasting program, type information about the ES, etc.

Meanwhile, if, as a result of the determination at step S110, the transport_stream_ID value is determined not to be identical with the Main_transport_stream_ID value, the reception apparatus 600 attempts tuning to any one channel (TS), from among Linkage_transport_stream_IDs obtained from the NIT at step S90, at step S140. The reception apparatus 600 may obtain a TS including the information about the broadcasting program through the step of S140 and also obtain the broadcasting program transmitted by the TSs for watching.

The reception apparatus 600 determines whether a search into all the Linkage_transport_stream_IDs has been completed or not at step S150. That is, the reception apparatus 600 determines whether a search into all TSs associated in order to send one program has been completed or not. If, as a result of the determination at step S150, a search into all the Linkage_transport_stream_IDs is determined to have been completed, the reception apparatus 600 finishes the process. In contrast, if, as a result of the determination at step S150, a search into all the Linkage_transport_stream_IDs is determined not to have been completed, the reception apparatus 600 performs the step S30.

The present invention may provide the method and apparatus for transmitting and receiving UHD or high-capacity broadcasting service having a great transmission bandwidth by using a plurality of associated TSs in a digital broadcasting system.

Furthermore, the present invention may provide information about an association between a plurality of TSs in a digital broadcasting system and also provide a signaling method and apparatus for serving UHD or high-capacity broadcasting having a great transmission bandwidth by using association information.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be to construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method comprising:
receiving a plurality of Transport Streams (TSs) from an Ultra High Definition (UHD) transmission or high-capacity broadcasting transmission, including a first TS through a transport channel;
determining whether the first TS includes information about an association relation with other TSs of the plurality of TSs by extracting a Program Associate Table (PAT) from the first TS to determine whether a Packet IDentifier (PID) value of a Network Information Table (NIT) packet includes the information about the association relation with the other TSs on the basis of the PAT;
in response to determination that the information about the association relation with the other TSs is included, analyzing the information about the association relation with the other TSs from the NIT of the first TS;
determining whether the first TS includes information about a program provided in the association relation with the other TSs based on the information about the association relation with the other TSs, wherein determining whether the first TS includes the information about the program includes determining whether an IDentifier (ID) of the first TS is identical with an Identifier (ID) of a second TS including the information about the program;
extracting the information about the program from the first TS and the second TS of the other TSs when the NIT of the first TS indicates an association relation with the second TS; and
obtaining the program based on the extracted information about the program.

2. The method of claim 1, wherein the information about the association relation with the other TSs includes at least one of IDentifier (ID) information about the first TS including the information about the program, channel information about the program, and identifier information about each of the other TSs associated with the first TS.

3. The method of claim 1, wherein the information about the association relation with the other TSs is included in the NIT of the first TS, which is a table for defining information about a network and channel configuration.

4. The method of claim 1, wherein extracting the information about the program from the first and the second TSs includes extracting at least one of information about Elementary Streams (ESs) constructing the program and channel information about the program from a Program Map Table (PMT) included in the first and the second TSs.

5. The method of claim 1, wherein the first TS has a first NIT and the second TS has a second NIT different from the first NIT, wherein the first NIT includes the association relation between the first TS and the second TS, further comprising utilizing the association relation between the first TS and the second TS to extract the information about the program from the first TS and the second TS.

6. An apparatus for receiving a plurality of associated Transport Streams (TSs) in an Ultra High Definition (UHD) or high-capacity broadcasting system, the apparatus comprising:
a reception unit configured to receive the plurality of TSs from the UHD transmission or high-capacity broadcasting transmission, including a first TS through a transport channel and extract a Program Associate Table (PAT)

from the first TS to determine whether a Packet IDentifier (PID) value of a Network Information Table (NIT) packet includes information about an association relation with other TSs on the basis of the PAT;

an association information processing unit configured to determine whether the first TS includes information about the association relation with the other TSs of the plurality of TSs and, in response to determination that the information about the association relation with the other TSs is included, analyzing the information about the association relation with the other TSs from the NIT of the first TS; and a program extraction unit configured to determine whether the first TS includes information about a program provided in the association relation with the other TSs based on the information about the association relation with the other TSs, wherein determining whether the first TS includes the information about the program includes determining whether an IDentifier (ID) of the first TS is identical with an IDentifier (ID) of a second TS including the information about the program, and extract the information about the program from the first TS and the second TS of the other TSs when the NIT of the first TS indicates an association relation with the second TS.

7. The apparatus of claim 6, wherein the association information processing unit determines whether the information about the association relation with the other TSs exists based on the PAT included in the plurality of TSs.

8. The apparatus of claim 6, wherein the association information processing unit extracts the information about the association relation with the other TSs from the NIT of the first TS, which is a table for defining information about a network and channel configuration and analyzes the extracted information.

9. The apparatus of claim 6, wherein the program extraction unit extracts the information about the program from a Program Map Table (PMT) included in the first and the second TSs.

10. The apparatus of claim 6, wherein the first TS has a first NIT and the second TS has a second NIT different from the first NIT, wherein the first NIT includes the association relation between the first TS and the second TS, wherein the program extraction unit is further configured to utilize the association relation between the first TS and the second TS to extract the information about the program from the first TS and the second TS.

\* \* \* \* \*